(12) United States Patent
Simpson et al.

(10) Patent No.: US 6,587,554 B1
(45) Date of Patent: Jul. 1, 2003

(54) SYSTEM AND METHOD FOR INTERFACING A PRIVACY MANAGEMENT SERVICE WITH A VOICE MAIL SYSTEM

(75) Inventors: Anita Hogans Simpson, Decatur, GA (US); Karen Mullis, Loganville, GA (US); Iris Regas, Atlanta, GA (US); James Vincent, Atlanta, GA (US); Scott Holt, Decatur, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 243 days.

(21) Appl. No.: 09/714,059

(22) Filed: Nov. 16, 2000

Related U.S. Application Data

(63) Continuation-in-part of application No. 09/372,676, filed on Aug. 12, 1999.

(51) Int. Cl.[7] .......................... H04M 3/42; H04M 7/00; H04M 1/64
(52) U.S. Cl. ............... 379/207.02; 379/70; 379/221.08; 379/230; 379/88.21
(58) Field of Search .......................... 379/207.02, 219, 379/221.08, 221.09, 221.1, 221.11, 221.12, 229, 230, 67.1, 70, 88.19, 142.01, 142.04, 142.05, 142.06, 207.15, 88.21

(56) References Cited

U.S. PATENT DOCUMENTS

| | | | | |
|---|---|---|---|---|
| 5,511,111 A | * | 4/1996 | Serbetcioglu et al. | 379/88.01 |
| 5,696,815 A | * | 12/1997 | Smyk | 379/142.16 |
| 5,701,301 A | | 12/1997 | Weisser, Jr. | 370/428 |
| 5,729,592 A | * | 3/1998 | Frech et al. | 379/88.19 |
| 5,838,774 A | | 11/1998 | Weisser, Jr. | 379/92.02 |
| 6,496,569 B2 | * | 12/2002 | Pelletier et al. | 379/88.21 |

* cited by examiner

Primary Examiner—Benny Q. Tieu
(74) Attorney, Agent, or Firm—Woodcock Washburn LLP

(57) ABSTRACT

A privacy screening service in an Advanced Intelligent Network (AIN) includes a service node which records a caller's name when a call directed to a subscriber of the service originates at an unknown number. The service node, in turn, places a call to the subscriber and transmits the recorded name together with a signal which is recognizable by a voice mail system. Following the transmission, the service node waits for the subscriber either to accept or reject a call from the caller. When the subscriber's line is answered by a voice mail system, the voice mail system recognizes and acknowledges the signal so that the voice mail system and service node may determine that their call is between two machines and may take appropriate action. One such action is to connect the caller to the subscriber's voice mail and to restart the subscriber's outgoing voice mail greeting.

31 Claims, 14 Drawing Sheets

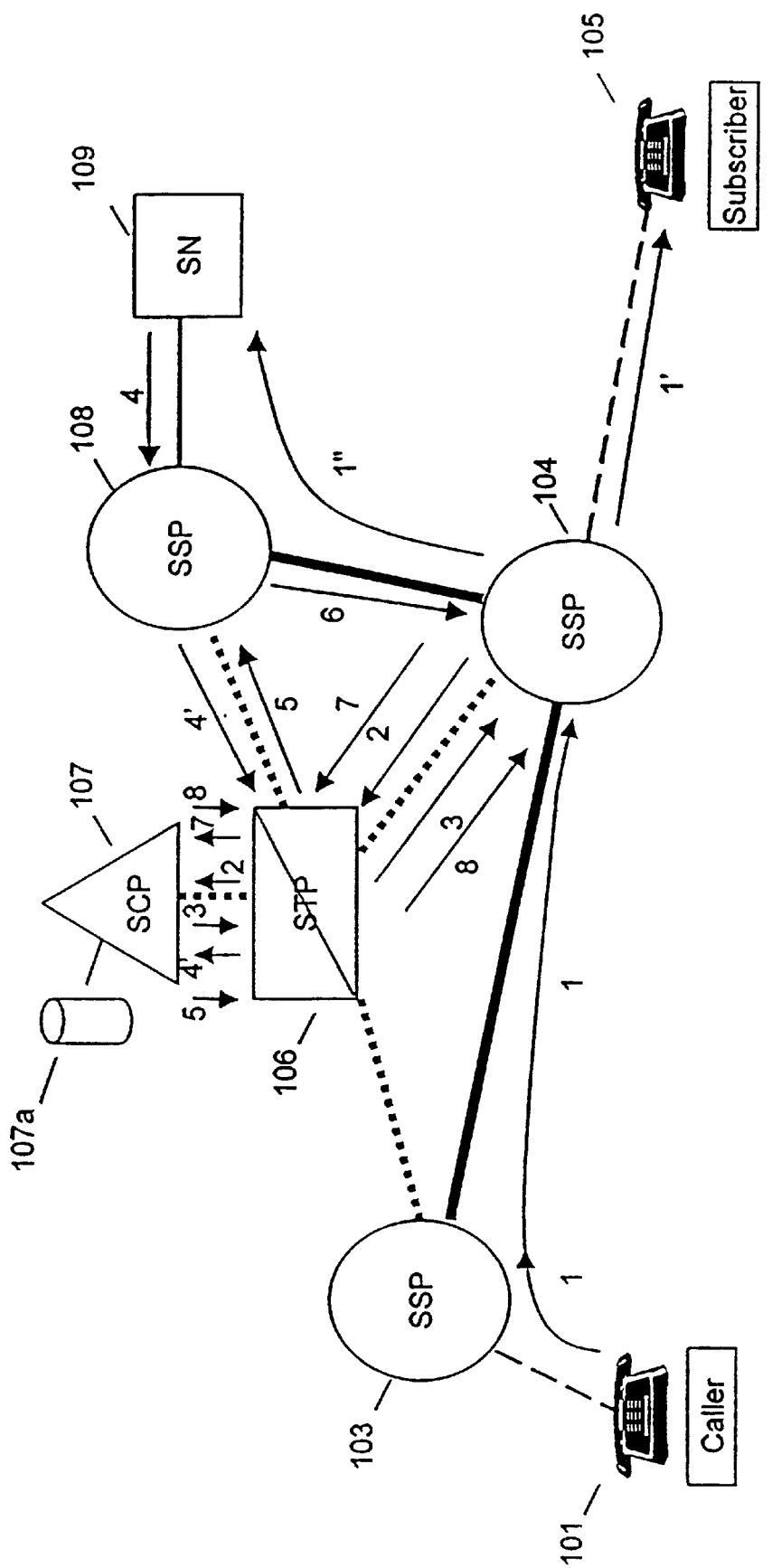

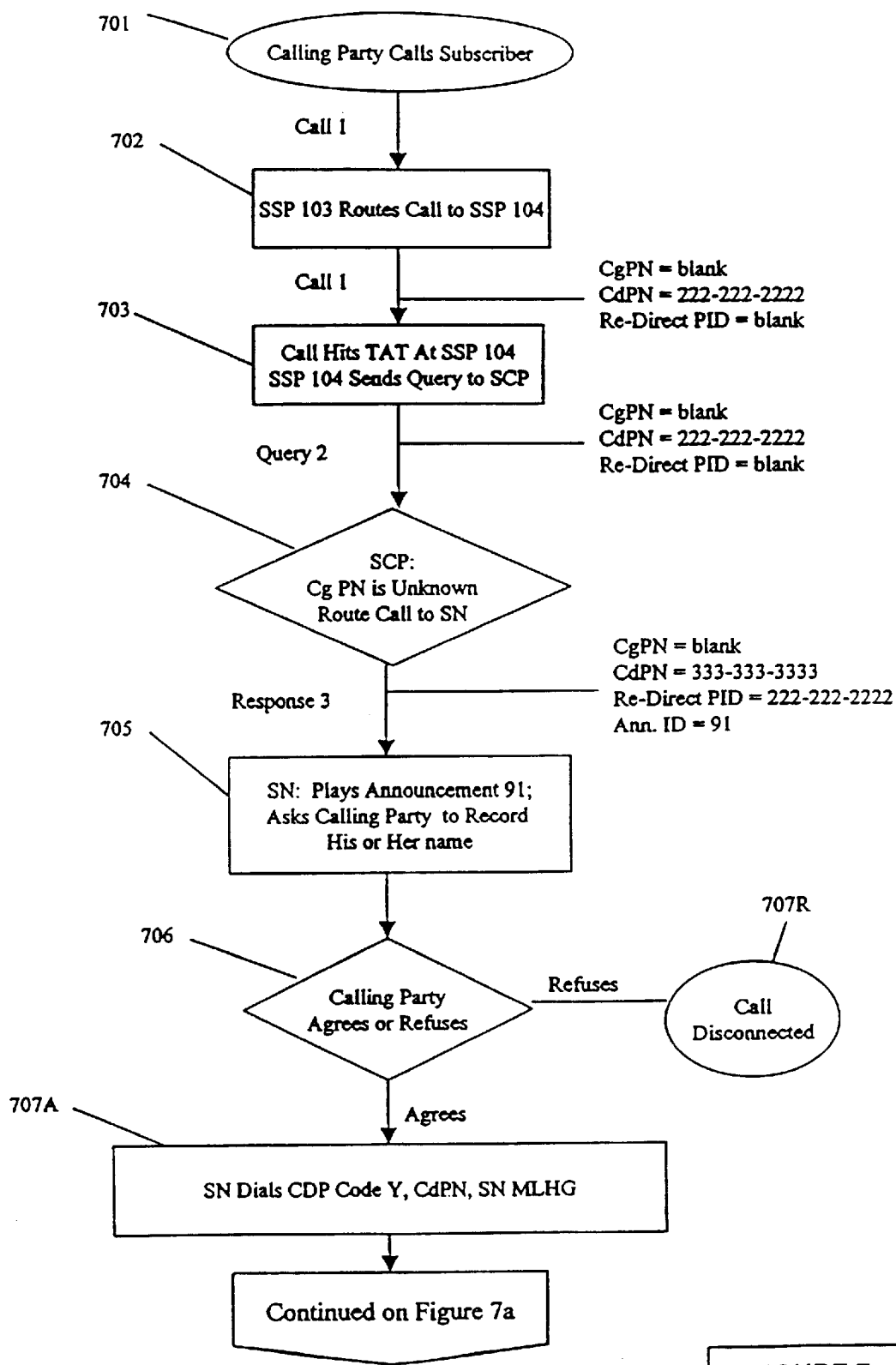

SYSTEM AND METHOD FOR INTERFACING A PRIVACY MANAGEMENT SERVICE WITH A VOICE MAIL SYSTEM

RELATED CASES

This application is a continuation-in-part of U.S. patent application Ser. No. 09/372,676, entitled "System and Method for Privacy Management," filed on Aug. 12, 1999.

FIELD OF THE INVENTION

The present invention relates to the termination of telephone call in a telephone network that provides a privacy screening service to its subscribers.

BACKGROUND OF THE INVENTION

A privacy screening service is a service that allows a subscriber to the privacy screening service to screen incoming calls. The privacy screening service provides information to the called party (in this case, the subscriber to the privacy screening service) that allows the subscriber to make an informed decision as whether or not to answer the call. For example, a subscriber may use the privacy screening service to block all unidentified calls from going through. Private telephone numbers are telephone numbers that block services such as "caller ID" that would otherwise identify the caller to the called party. In telephone systems that offer private numbers and a privacy screening service to its customers, calls from a private number to a subscriber with the privacy screening service cannot be completed automatically, unless the caller authorizes the system to override the privacy of his number.

FIG. 1 is a schematic diagram showing the basic architecture of an Advanced Intelligent Network telephone system. The Advanced Intelligent Network System is described in U.S. Pat. Nos. 5,701,301 and 5,838,774, which are hereby incorporated by reference. FIG. 1 shows the caller's telephone 101 which is connected via the calling party's voice line 102a to its Service Switching Point (SSP) 103. SSP 103 is connected via voice trunk 102b to a second SSP (SSP 104). SSP 104 is the SSP that services the called party's telephone 105. In this example, the called party is a subscriber who has subscribed to the privacy screening service. (The called party will also be referred to as the "subscriber", as well as the "called party" herein) FIG. 1 also shows a Signaling Transfer Point (STP) 106 which services a Service Control Point (SCP) 107 and a third SSP (SSP 108) which services a Service Node (SN) 109. SCP 107 has a database 107a that contains subscriber information.

STP 106 is a signaling hub that routes packets of data over the common channel signaling network. Common channeling signaling are data communications networks laid over the system's switching network that carry data and control messages to and from and among the SSPs, STPs, and SCPs in the network. Signaling System 7 (SS7) is the protocol that runs over common channel signaling networks. A common channel signaling network using the Signaling System 7 protocol is often referred to as an SS7 network. The SS7 network carries data and control messages to the SSPs in the telephone network. SCPs are powerful fault-tolerant computers, e.g., AT&T Star Server FT Model 3200 or AT&T Star Server FT Model 3300 computers (these and more, current computers such as the Advantage P200 and Advantage 4P200 models are presently available from Lucent Technologies). SCPs are "intelligence centers" with access to applications databases that mate the network to deliver advanced services such as caller ID, privacy screening and call forwarding. The SCPs also execute service package applications (SPAs) that deliver the advanced services. SNs are physically generally similar to SCPs, but include voice and Dual Tone Multi-Frequency (DTMF) signal recognition circuits, voice synthesizers, and voice recognition and digit collection capabilities. The operators of the telephone network can program their SNs to manage data, to respond to calls and to route calls as specified by the telephone network and to collect digits from a caller or subscriber. The SNs voice circuits can also be programmed to provide a voice response (e.g., to play pre-selected announcements) to callers and to perform voice recognition. SNs can also be programmed to respond to input from the callers by, e.g., further routing the call.

As shown in FIG. 1, STP 106 controls communications between SSPs 103, 104 and 108 and SCP 107. The SSPs are connected to the caller's and the subscriber's telephones and to each other via voice lines 102a and 102c and via voice trunks 102b and 102d. The SSPs communicate with STP 106 and SCP 107 via SS7 data links 110a, 110b, 110c, and 110d. SN 109 is connected to SSP 108 by an Integrated Service Digital Network (ISDN) Basic Rate Interface (BRI) line 111.

When the caller places a call to the subscriber, the call is routed by SSP 103 to art system in which call 1 is routed from the caller to SSP 104. FIG. 1a shows a prior SSP 103 and then to SSP 104. Because the subscriber has subscribed to the privacy screening service, that call (like all calls to that subscribes number) triggers a termination attempt trigger or TAT. In response to the TAT, SSP 104 query 2, shown in FIG. 1a. Query 2 is a message that goes up to SCP 107 via STP 106 asking for directions as to how the call should be terminated. The query includes the following information: the subscriber's telephone number (in the calling party field), the calling party's telephone number (in the calling party field), the calling party's presentation restriction indicator (also in the calling party field), and, optionally, the trigger criteria type (indicating the service for which the query is intended).

SCP 107 checks the presentation indicator in the calling party field of the query received as a result of the termination attempt trigger. If presentation of the caller's number is not restricted, i.e., if the caller's number is public, SCP 107 sends back a response (response 3 in FIG. 1a) instructing SSP 104 to terminating the call, and to supply the caller's telephone number (and, if that subscriber has subscribed to a higher level of service such as caller ID deluxe, the caller's name and telephone number). In that case, SSP 104 terminates the call (call 1' in FIG. 1a), i.e., completes the call supplying the subscriber with the caller's number (and possibly also with the causes name). If the callers name is to be supplied to the customer, SSP 104 launches another query, a TR1188 CNAM query to the SCP, to obtain the caller's name from either database 107a or another database on the system that contains the names correspond to the telephone numbers.

The prior art system of FIG. 1a asks the calling party to record his or her name whenever the calling party number is private or unknown. In this prior art system, if the caller's number is private or unknown, SCP 107 enters the subscriber's number in the calling party field in response 3 and directs SSP 104 to forward the call to SN 109 (call 1" in FIG. 1a). When SN 109 answers the call it asks the calling party to record his or her name. If the calling party responds by recording his or her name, SN 109 then the. subscriber (call 4 in FIG. 1a), using the subscriber's telephone number (that had been stored in the calling party field).

The TAT provisioned on the subscriber's line at SSP 104 triggers a second time, sending a query (query 5) up to SCP 107 through STP 106. SCP 107 recognizes that this call originated with a service node, SN 109, and sends a response (response 6 in FIG. 1a) authorizing termination to the subscriber. SN 109 then plays a dialog to the subscriber, identifying the calling party by playing the calling party's recorded name for the subscriber. If the subscriber chooses to accept the call, the call is put though (leg 4' of call 4 in FIG. 1a). If the subscriber refuses to accept the call, the calling party is informed that his or her call was not accepted, and the call is disconnected.

This prior art system works irrespective of whether the calling party number is public (i.e., not private), private or unknown, but cannot take full advantage of the advanced intelligent network capabilities of the AIN system because the number is not preserved. Thus this prior art system does not allow the use of advanced intelligent network features such as call return or call trace.

Additionally, the prior art does not provide a mechanism by which it can be detected when a voice mail system has answered the call placed from the service node to the subscriber, thereby possibly creating the situation that the service node plays a recorded name for a voice mail system and waits for an accept/reject response that the voice mail system is unable to provide.

SUMMARY OF THE INVENTION

The present invention is a system and method that allows calls to be terminated to a subscriber to a privacy screening service, even when the calling party is either private or unknown, and preserves the calling party number when the calling party number is known (whether the calling party number is public or private). The present invention is illustrated in FIGS. 2–3, which show the same basic AIN architecture as the network architecture of prior art systems of FIGS. 1–1a. FIG. 2 shows the operation of the present invention when the calling party is known (for both the case when the calling party number is private and the case when the calling party number is public). FIG. 3 shows the operation of the invention when the calling party number is unknown.

As shown in FIG. 2, when the calling party dials the subscriber's number, the call is routed (as call 1 in FIG. 2) through the caller's SSP (SSP 103), to the subscriber's SSP, SSP 104. The call hits the subscriber's TAT at SSP 104, triggering a query (query 2) in FIG. 2, which goes up to SCP 107 via STP 106, over SS7 links 110b and 110d (links 110b and 110d are identified in FIG. 1, but are not identified in FIGS. 2–3).

SCP 107 checks the calling party ID and presentation indicator in query 2, and determines whether the calling party is known and public, known and private, or unknown. In the present invention, if the calling party number is public and known, SCP 107 sends back a response authorizing termination to the subscriber (response 3 in FIG. 2). If the subscriber has subscribed to a service that provides the calling party's name as well as the calling party's telephone number, SSP 104 then launches a query (e.g., a TR-1188 query) to obtain calling name information from SCP 107 and its database 107a. Then SSP 104 terminates the call to the subscriber (call 1' in FIG. 2), presenting the subscriber with the calling party's number (and name, if the subscriber has subscribed to a service that provides the calling party's name as well as the calling party's number).

If the calling party number is private, SCP 107 re-writes the presentation indicator as "public", i.e., redefines the presentation indicator in the presentation indicator field (i.e., the presentation_restricted_indicator portion of the calling party ID field in the query) as public. As shown in FIG. 2, SCP 107 responds to the TAT query from SSP 104 by directing SSP 104 to forward the call to SN 109, with the presentation indicator re-written as public. SSP 104 writes the subscriber's number in the "re-directing party" field, and forwards the call (call 1" from SSP 104 to SN 109 in FIG. 2) to SN 109 at SN 109's number via SSP 108. Thus, when the call is presented to SN 109, the call has the subscriber's number in the "re-directing party" field, and the original calling party's is number in the "calling party" field. Because SCP 107 bas toggled the presentation indicator from "private" to "public", SN 109 has access to the calling party number. SN 109 answers the call, and plays an announcement to the calling party, asking for his/her permission to present his/her number (and name) to the subscriber. If the calling party refuses to grant permission to present his/her number (and name) to the subscribe the call is disconnected. If the calling party agrees to have his/her number (and name) presented, SN 109 dials a Customized Dialing Plan (CDP) code Y (e.g., *95), the 10-digit called party number, and the 10-digit calling party number (call 4 in FIG. 2).

The CDP code Y triggers a query at SSP 108, which launches an info_analyzed query to SCP 107 (query 4' in FIG. 2), populating the "Access Code" and "Collected Digits" fields as follows:

Access Code=Y

Collected Digits=The remainder of the dialed digits, i.e., the 10-digit called party number followed by the 10-digit calling party number.

SCP 107 analyzes the dialed string and returns an analyze route response (response 5) with:

CdPN=Subscriber's number

CgPN=Calling party number

SSP 108 then dials the subscriber number (call 6 in FIG. 2). This call is routed through SSP 104, where it triggers a TAT query (query 7) from SSP 104 to SCP 107 with the following parameters:

CgPN=Calling party number.

CdPN=Subscriber's number

Charge Number=SN 109's number, e.g., lead number for SN 109's Multi Line Hunt Group (MLHG) number SCP 107 recognizes the Charge Number as SN 109's MLHG number, and authorizes SSP 104 to terminate the call (response 8). SSP 104 then presents the call to the subscriber (call 1' in FIG. 2, with the presentation indicator set to "public"). SSP 104 obtains the calling party's name by sending a CNAM TR-1188 query to SCP 107 (or to another SCP that responds to TR-1188 CNAM queries). As soon as the subscriber's telephone rings, SN 109 can drop out of the route, with the call routed through SSPs 103, 104, 108 and 104 (again) and on to the subscriber.

FIG. 3 shows the operation of the present invention when the calling party is unknown. As above, the sequence starts when the calling party dials the subscriber's number. The call is routed (as call I in FIG. 3) through the caller's SSP, SSP 103, to the subscriber's SSP, SSP 104. The call hits the subscriber's TAT at SSP 104, triggering a query (query 2 in FIG. 3), which goes up to SCP 107 via STP 106, over SS7 links 110b and 110d. SCP 107 examines the presentation indicator in the calling party ID field in query 2, and determines that the number is unknown.

In response 3 to query 2, SCP 107 them directs SSP 104 to route the can to SN 109 (call 1' from SSP 104 to SN 109 in FIG. 3). The call arrives at SN 109 with the subscriber as the redirecting party, the calling party number in the calling party field, and the SN number in the called party field. When the call is presented to SN 109, SN 109 checks the calling party number, and determines that it is unknown. SN 109 then plays an announcement to the calling party, asking the calling party to record his or her name. If the calling party refuses to do so, the call is disconnected. If the calling party agrees to record his/her name, SN 109 dials the CDP code Y, the 10-digit called party number, and the 10-digit SN Multi Line Hunt Group number (call 4 in FIG. 3). The CDP code Y triggers a query at SSP 108, which sends an info__analyzed query (query 4' in FIG. 3) to SCP 107, populating the "Access Code" and "Collected Digits" fields as follows:

Access Code=Y

Collected Digits=the remainder of the dialed digits, i.e., the 10 digit called party number and the 10-digit SN MLHG number.

SCP 107 analyzes the query and returns an analyze__route message (response 5) to SSP 108, which then calls the subscriber (call 6) with:

CdPN=subscriber's number

CgPN=SN's MLHG number.

This call triggers a TAT query (query 7) on the subscriber's line at SSP 104. The query includes SN 109's MLHG number as the calling party number, the subscriber's number as the called party number, and SN 109's MLHG number as the charge number. Since the charge number is the lead number for SN 109's MLHG, SCP 107 sends SSP 104 an Authorize Termination message (response 8), authorizing termination of the call from SSP 104 to the subscriber. SSP 104 &en executes a TRI 188 query, which returns the privacy manager as the party name. SSP 104 then completes the call (call 1"). For subscribers to caller ID deluxe, the LCD display on the subscriber's telephone will show, e.g., "Privacy Manager" as the caller party.

SN 109 then plays an announcement to the subscriber, asking the subscriber whether he or she would like to accept or reject a call from the calling party, whose name is played for the subscriber as "recorded name." The subscriber can then e.g., accept the call by pressing 1, have a simple rejection played by pressing 2, have a "sales call", rejection ("we do not accept sales calls, please remove this number from your caller list") played by pressing 3, or route the call to voicemail by pressing 4. If the subscriber accepts the call, SN 109 transfers control of the call to SSP 104, and drops out (although the call is still routed through SSP 108). If the subscriber rejects the call, SN 109 plays the announcement selected by the subscriber or routes the call to voicemail, and then the call is disconnected.

The present invention thus preserves the calling party number, such that the system can take full advantage of the capabilities of the advanced intelligent network, e.g., call return or call trace for all known calls, whether private or public.

It is an object of the present invention to offer a privacy service to subscribers that allows private calling parties to override their privacy, and that allows calls from unknown calling parties to be routed to the subscriber, and yet still allows the use of advanced intelligent network features.

Additionally, in the case where service node 109 places a call to a subscriber and plays a "recorded name," the call to the subscriber may be redirected to a voice mail system. According to a further aspect of the present invention, service node 109 may provide a recognizable signal along with the "recorded name" message, so that the voice mail system can detect that it is receiving a call from the service node rather than a live caller. For example, the service node may precede the recorded message with a particular tone, preferably a unique dual tone. In response, the voice mail system may provide its own acknowledgment signal that is detectable by the service node. These signals allow service node 109 and the voice mail system to detect that the two machines are in communication, thereby preventing the situation in which the two machines simultaneously provide each other with recorded messages and then wait for human responses from each other.

BRIEF DESCRIPTION OF THE DRAWINGS

FIG. 2 is a schematic, diagram of the present invention, showing the routing of calls when a subscriber has subscribed to a privacy service and the calling party number is known.

FIGS. 7–7a are charts outlining the call flows of the present invention, when the subscriber has subscribed to a privacy screening service, and the calling party's number is unknown.

DETAILED DESCRIPTION OF THE INVENTION

Figure 4:
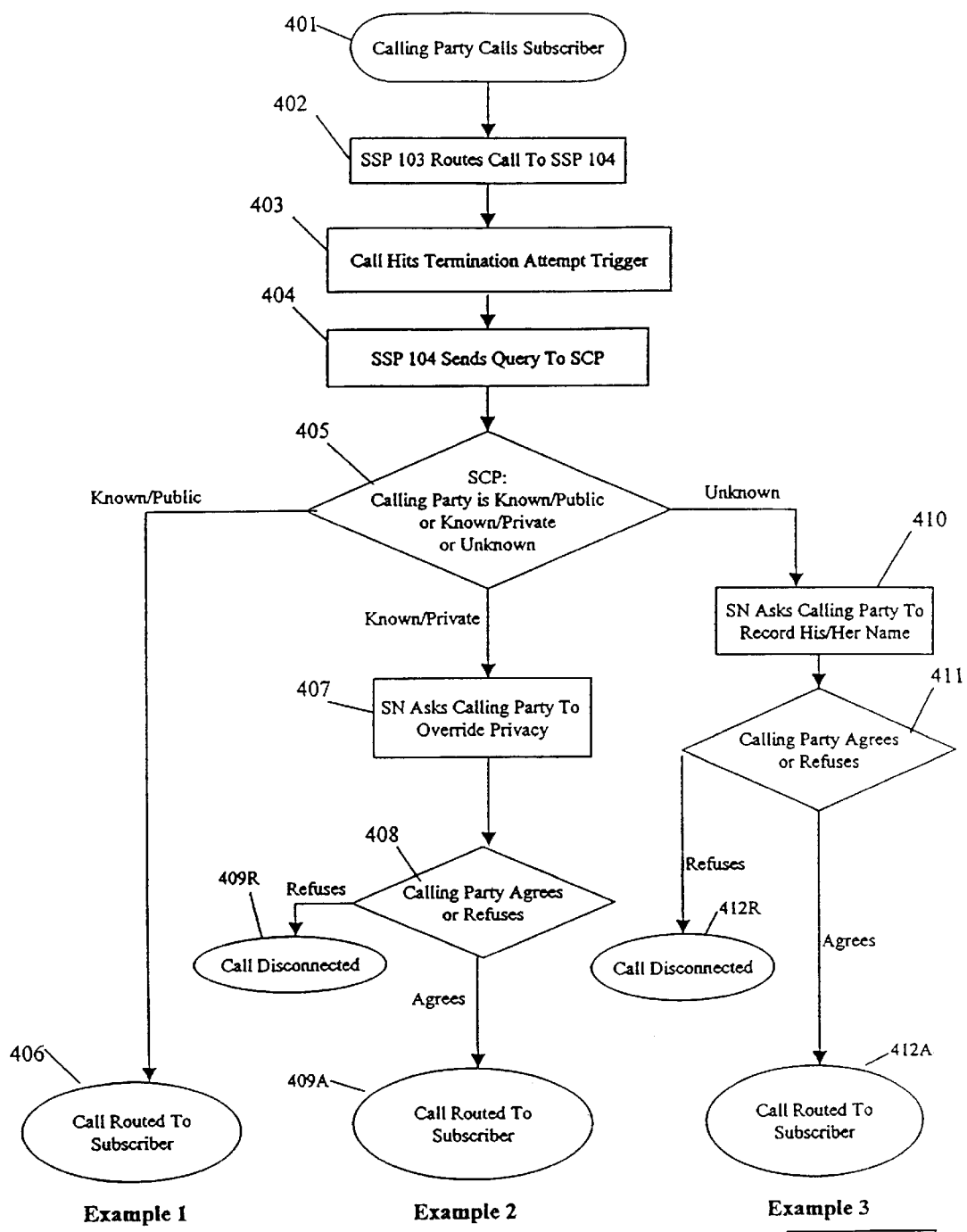
FIG. 4 is an overall schematic diagram of the call flows of the present invention, showing how the call flows depend upon whether the calling party number is public, private or unknown.

The present invention can be described by describing the sequence of call flows initiated when a calling party calls a subscriber who has subscribed to a privacy service. FIG. 4 is an overall schematic showing that the call flows depend on whether the calling party number is known and public (further described in Example 1 and FIG. 5), known and private (further described in Example 2 and FIGS. 6–6a) or unknown (further described in Example 3 and FIGS. 7–7a). As shown in FIG. 4, the call sequence starts in step 401, when the calling party dials the subscriber's telephone number. The calling party's SSP, SSP 103, routes the call to the subscriber's SSP, SSP 104 in step 402. Because the subscriber has subscribed to a privacy screening service, in step 403 that call hits a "termination attempt trigger" or TAT at SSP 104. In response to the TAT, SSP 104 sends a query up to SCP 107 in step 404. In step 405, SCP 107 determines whether (1) the calling party number is known and public, in which case the call is routed to the subscriber in step 406, as described in Example 1 and FIG. 5; (2) the calling party number is known and private, in which case the call is routed to SN 109, which asks the calling party to override his or her privacy (step 407), the calling party agrees or refuses (step 408) and then SN 109 routes the call to the subscriber if the calling party agrees (step 409A) or disconnects the call if the calling party refuses (step 409R), as described in Example 2 and FIGS. 6–6a; or (3) the calling party number is unknown, in which case the call is also routed to SN 109, SN 109 asks the calling party to record his or her name in step 410, the calling party refuses or agrees to record his or her name in step 411, and then the call is disconnect (step 412R) or routed to the subscriber (step 412A). This sequence for unknown calling parties is described in Example 3 and FIGS. 7–7a.

As discussed above, FIGS. 5–7a represent schematically the call flows corresponding to the cases described below in Examples 1–3. The acronyms used in FIGS. 5–7a are:

| Calling Party Number: | CgPN |
| Called Party Number: | CdPN |
| Charge Number: | ChargeN |
| Re-Directing Party ID: | Re-DirectID |
| Presentation indicator: | Privacy |
| Display Text: | DspTxt |
| Announcement Identification: | AnnID |
| Collect Digits: | CollDig |

The announcements played by the network will be exemplified as follows:

91: Announcement to an unknown calling party, asking the calling party to record his/her name.

92: Announcement to the subscriber, playing the calling party's name, and asking the subscriber to accept or reject the call.

93: Announcement to the calling party when the calling party's number is private, asking the calling party for permission to provide his/her number (and name) to the subscriber, and explaining that if permission is not granted, the call will be disconnected.

For the purpose of illustrating the invention with specific examples, the flow in FIGS. 5–7a will all have the calling party number (CgPN) as 111-111-1111) the subscriber's number (initially, CdPN) as 222-222-2222, and the Service Node's Multi-Line Hunt Group number as 333-333-3333.

The specific sequence of calls depends on the private/public/unknown status of the calling party. As described in Examples 1–3, there are three possible call sequences.

EXAMPLE 1

Calling Party is Known and Public

Figure 5:
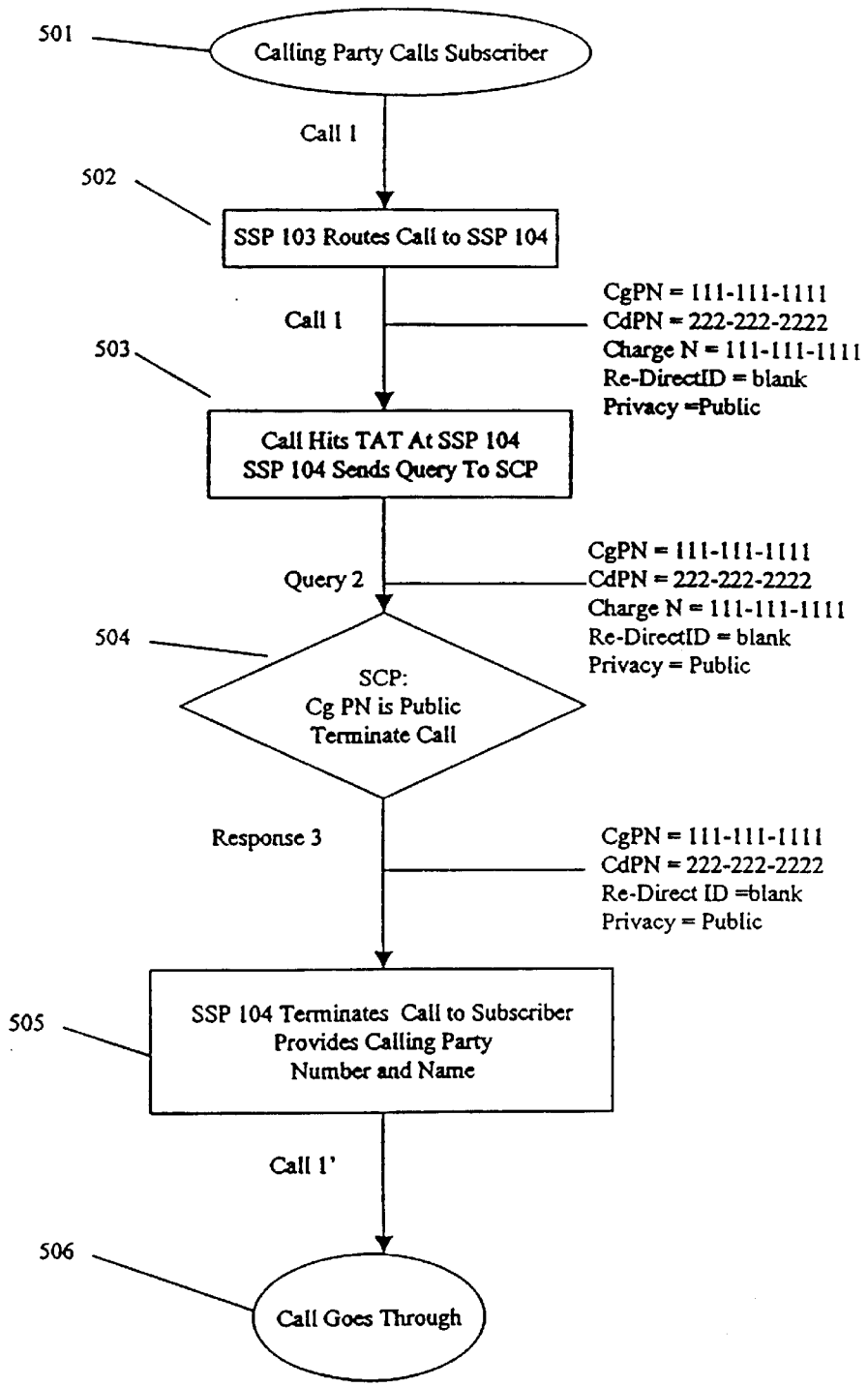
FIG. 5 is a chart outlining the call flows of the present invention, when the subscriber has subscribed to a privacy screening service, and the calling party's number is known and public.

FIG. 5 is a chart showing the call flows to a subscriber when the subscriber has subscribed to a privacy screening service, and the calling party is known (i.e., it is in the system's database) and is public (i.e., there are no restrictions on disclosing the name and number to a called party that has, e.g., caller ID). The sequence is also illustrated in FIG. 2 (call 1, query 2, response 3, call 1).

As shown in FIG. 5, the call flows start in step 501, with the calling party dialing the subscriber's telephone number. That call (call 1 in FIG. 2) goes through the calling party's SSP (SSP 103), carrying with it the calling party's number 111-111-1111 in the CgPN field, the subscriber's or called party number 222-222-2222 in the CdPN field, the calling party's number in the charge number field, and leaving the ReDirectID field blank. The presentation indicator is set to public. In step 502, SSP 103 routes the call to the subscriber's SSP (SSP 104). When the call reaches SSP 104, it hits a termination attempt trigger (or TAT) that has been provisioned on the subscriber's line at SSP 104, to provide the subscriber with the privacy screening service. 'Mus in step 503, SSP 104 sends a TAT query (query 2 in FIG. 2) to SCP 107. In step 504, SCP 107 checks the presentation indicator in the Calling Party ID and determines that the calling party information is not restricted, i.e., is public, and authorizes termination of the call (response 3).

In step 505, SSP 104 terminates the call to the subscriber, providing the subscriber with the calling party's number (and name if the subscriber's service provides name as well as number). In step 506, the call goes through (calling FIG. 2).

EXAMPLE 2

Calling Party is Known and Private

Figure 6:
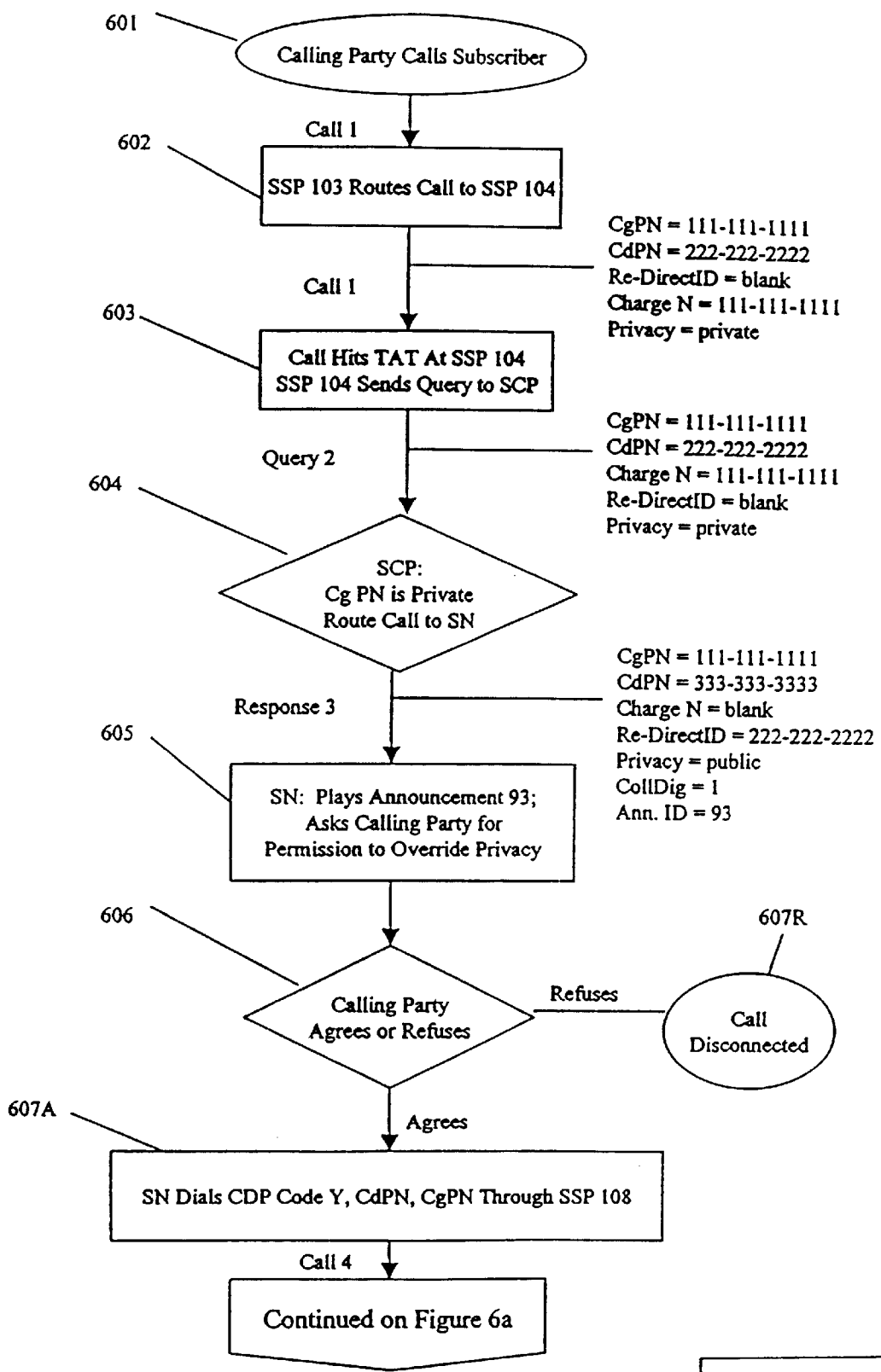
FIGS. 6–6a are charts outlining the call flows of the present invention, when the subscriber has subscribed to a privacy screening service that provides the name and the number of the calling party, and the calling party's number is known and private.
Figure 6A:
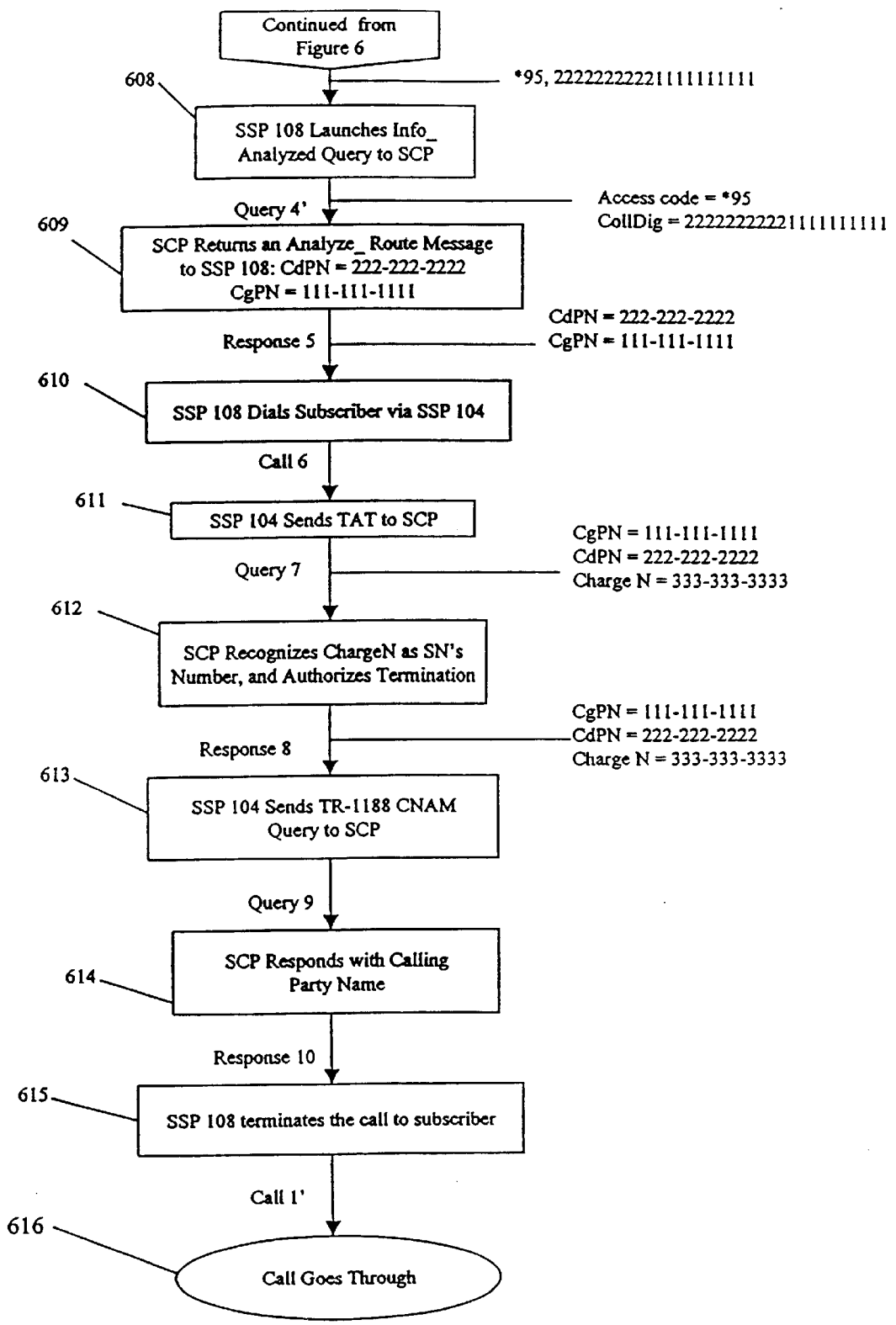

FIGS. 6–6a are charts showing the call flows to a subscriber to a privacy scanning service, when the calling party is known, but his/her number is private. In step 601, the calling party starts the call sequence by dialing the subscriber's number. The call goes to the calling party's SSP (SSP 103), which routes the call in step 602 to the subscriber's SSP (SSP 104). Because the subscriber's line at SSP 104 is provisioned with a TAT, this call triggers a TAT query (query 2) from SSP 104 to SCP 107 in step 603. In step 604, SCP 107 checks the presentation indicator in the calling party ID field and determines that the calling party's number is private. SCP 107 then toggles the calling party's presentation indicator from "private" to "public", and instructs SSP 104 to send the call to SN 109, with instructions to SN 109 to play an announcement to the calling party, and collect one digit in response.

In step 605, SN 109 plays an announcement (e.g., announcement 93) asking the calling party to agree to have his or her number (and name) disclosed to the subscriber. In step 606, the calling party can respond by, e.g., pressing "1" to agree or "2" to refuse, and SN 109 collects the digit pressed (e.g., the 1 or the 2). If the calling party refuses ion, in step 607R SN 109 responds by disconnecting the call. In that case, the subscriber never knows that an attempt was made to call him or her.

If the calling party agrees to have his or her privacy overridden step 607A SN 109 dials a CDP code Y, the 10-digit called party number and the 10-digit calling party number (call 4 in FIG. 2). In step 608. SSP 108 responds to the CDP code by sending an info_analyzed query (query 4') to SCP 107, populating the "Access Code" and "Collected Digits" fields as follows:

Access code=Y (*95, in this example)

Collected Digits=the remainder of the digits, ie. the 10-digit called party number followed by the 10-digit calling party number.

In step 609, SCP 107 responds with an analyze_route message (response 5) to SSP 108, with the subscriber's number in the CdPN field, and the calling party number in the CgPN field. SN 109 then dials the subscriber's number in step 610 (call 6). When this call reaches SSP 104, it triggers a TAT, since the subscriber's line is provisioned with the TAT for the privacy screening service. In step 611, SSP 104 sends the TAT query to SCP 107 (query 7), with the calling party's number in the CgPN field, the subscriber's number in the CdPN field, and SN 109's number in the ChargeN field. In step 612, SCP 107 recognizes the charge number as SN 109's number, and authorizes termination of the call to the subscriber (response 8). In step 613, if the subscriber has caller ID Deluxe, SSP 104 sends a TR-1188 CNAM query (query 9, shown only in FIG. 6a) to SCP 107, which responds in step 614 with the calling party's name (response 10, shown only in FIG. 6a). SSP 108 terminates the call to the subscriber in step 615, and the call goes through in step 616 (call 1' in FIG. 2).

EXAMPLE 3

Calling Party is Unknown

Figure 1:
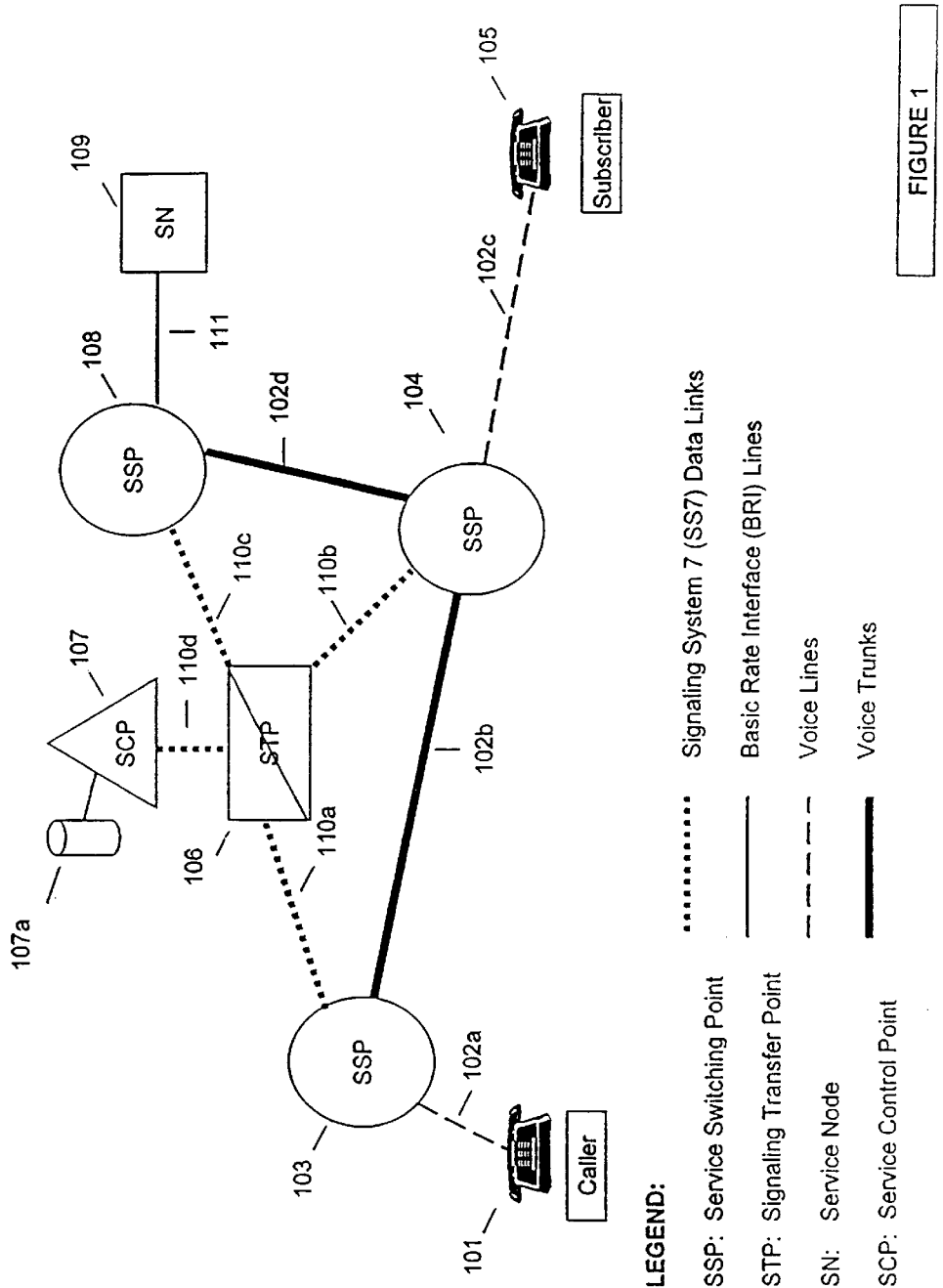
FIG. 1 is a schematic diagram showing the basic architecture of an AIN telephone network.
Figure 1A:
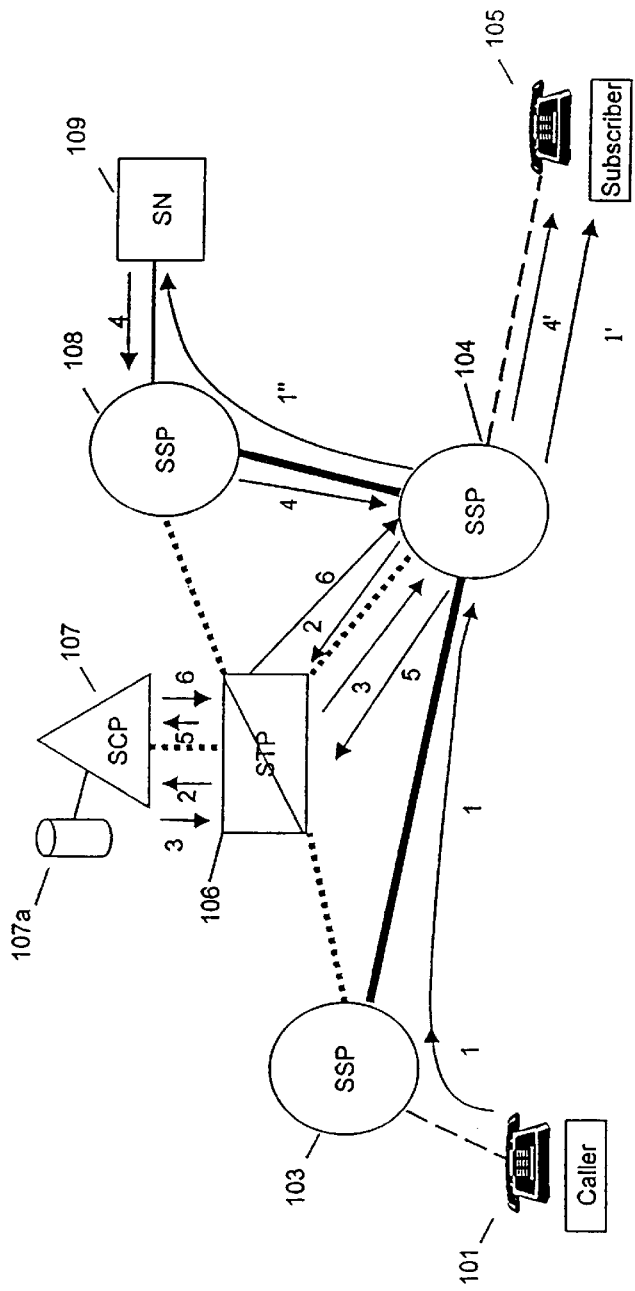
FIG. 1a is a schematic diagram showing a prior art system routing of calls when a subscriber has subscribed to a privacy screening service.
Figure 3:
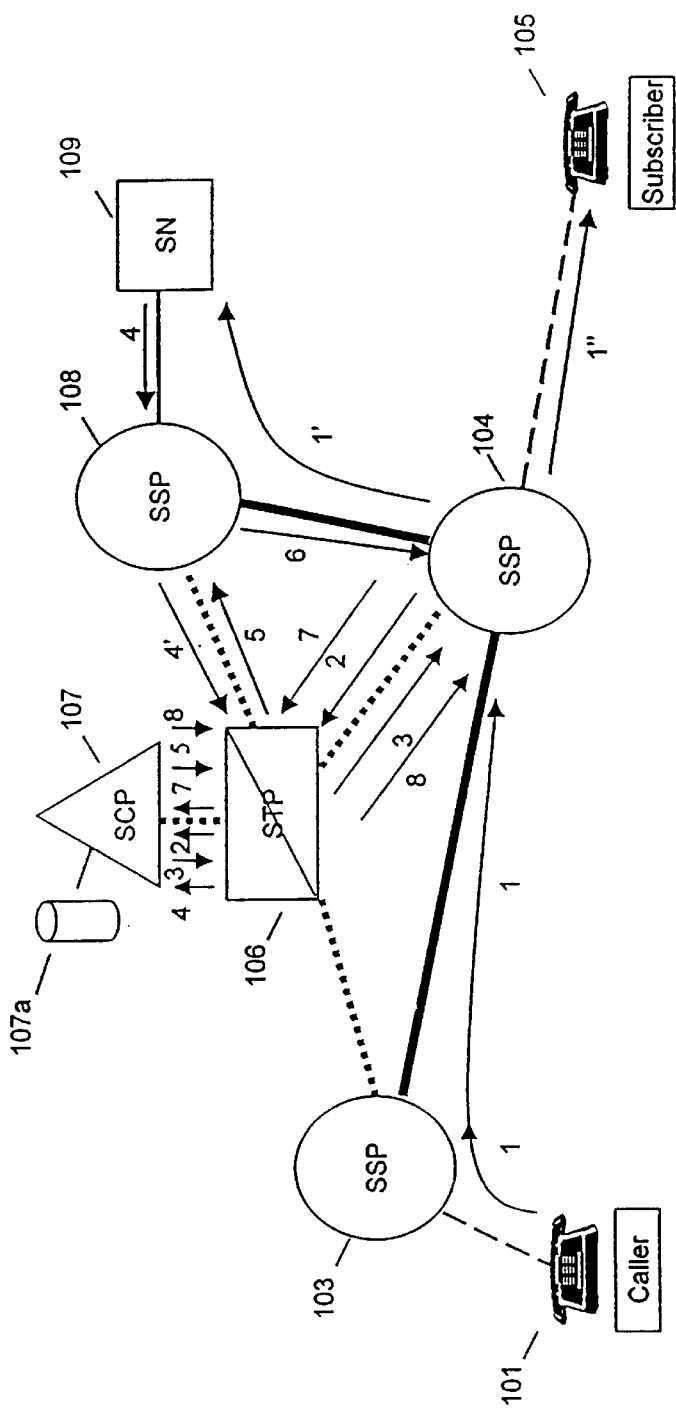
FIG. 3 is a schematic, diagram of the present invention, showing the routing of calls when a subscriber has subscribed to a privacy screening service and the calling party number is unknown.
Figure 7A:
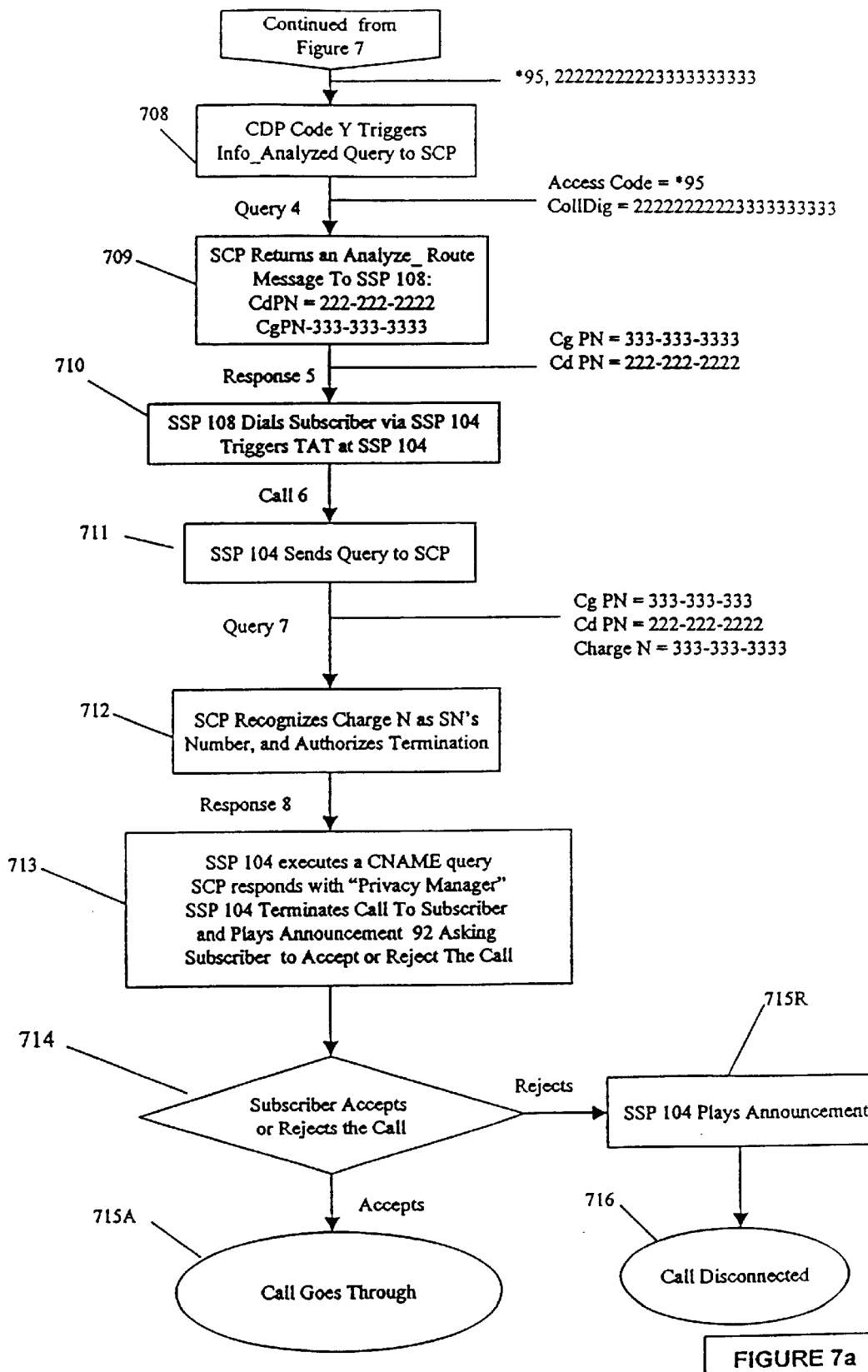

FIGS. 7–7a are charts showing the call flows to a subscriber to a privacy service when the calling party is unknown (e.g., because the call is coming from outside the network). in step 701, the calling party dials the subscriber's number. The call (call 1 in FIG. 3) is routed by the calling party's SSP 103 to the subscriber's SSP 104 in step 702. This call triggers a TAT at SSP 104, because the subscriber's line is provisioned with a privacy screening TAT. In step 703, SSP 104 sends the TAT query to SCP 107 (query 2 in FIG. 3). In step 704, SCP 107 checks the calling party ID and determines that the calling party is unknown. SCP 107 then responds (response 3) to query 2 by instructing SSP 104 to route the call to SN 109, with instructions to SN 109 to play an announcement to the caller. SSP 104 routes the call to SN 109 via SSP 108. The call reaches SN 109 with the SN's Multi-Line Hunt Group Number in the CdPN field, and the subscriber's number in the ReDirectID field. The calling party field is blank. In step 705, SN log plays an announcement, e.g., announcement 91, asking the calling party to record his or her name. The calling party agrees, e.g., by saying their name, or refuses (e.g., by hanging up) in step 706. If the calling party refuses to record his or her name, the call is disconnected in step 707R.

If the calling party records his or her name, in step 707A SN 109 dials CDP code Y, e.g., *95, followed by the subscriber's number and the lead number of SN 109's Multi-line Hunt Group. In step 708, this dialed string reaches SSP 108, and the CDP code Y triggers an info-query (query 4) from SSP 108 to SCP 107, with the "Access Code" and "Collected Digits" fields populated as follows:

Access code=Y (*95, in this example)
Collected Digits=the remainder of the digits, i.e. the 10-digit party number (the subscriber's number), followed by the 10-digit party number of SN 109's MLHG.

In step 709, SCP 107 analyzes the string and returns an analyze route message (response 5) with the subscriber's number in the CdPN field and SN 109's lead Multi-Hunt Group number in the CgPN field. SSP 108 calls the subscriber in step 710 (call 6 in FIG. 3) via SSP 104, triggering the TAT on the subscribers line at SSP 104. In step 711, SSP 104 then sends the TAT query (query 7) to SCP 107. This query has SN 109's Multi Line Hunt Group lead number in the charge party field. In step 712, SCP 107 recognizes SN 109's number in the charge party field, and authorizes termination of the call (response 8).

In step 713, SSP 104 terminates the call to the subscriber, and plays an announcement (e.g., announcement 92) that includes playing the recording of the calling party's name. If the subscriber subscribes to caller ID deluxe, SSP 104 also executes a CNAW query to SCP 107, to which SCP 107 responds with "Privacy Manager" (or a similar name) as the calling party. In step 714, the subscriber decides whether to accept or reject the call. If the subscriber rejects the call, SSP 104 plays an announcement to the caller rejecting the call in step 715R, and the call is disconnected in step 716. If the subscriber rejects the call, optionally the subscriber may select a simple rejection or a sales call rejection, or may choose to forward the call to voicemail. If the subscriber decides to accept the call, the call goes through in step 715A.

Figure 8:
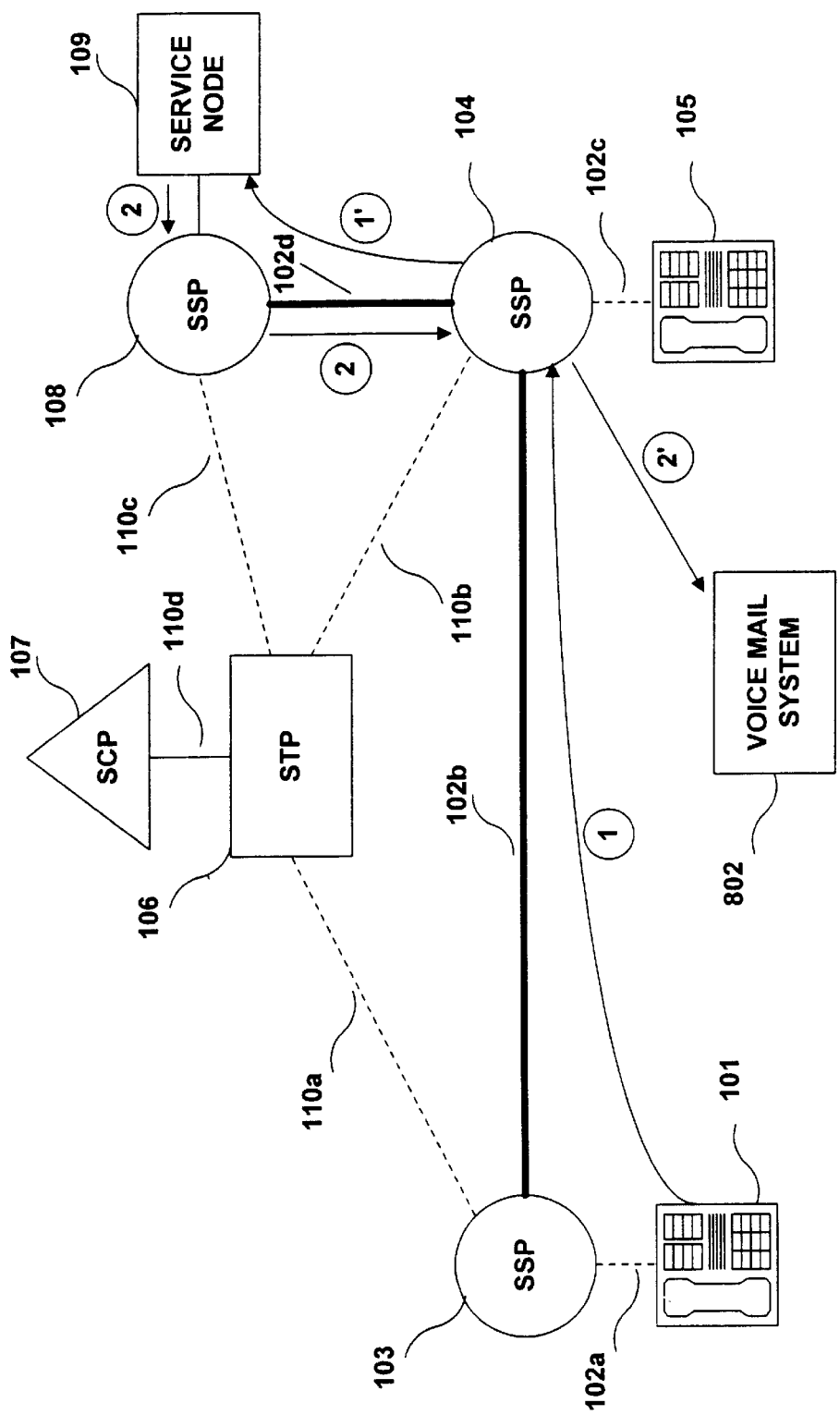
FIG. 8 is a block diagram showing the re-routing of a call from a service node in the case where a subscriber of a privacy screening service has also subscribed to a voice mail service.

Detection of Voice Mail System During Identification of Calling Party by a Recorded Message Referring now to FIG. 8, there is shown a particular case of the processing of a call within an AIN. Specifically, FIG. 8 describes the case in which the caller has an unknown number, and in which the service node's call to the subscriber is answered by a voice mail system. With reference to previous figures, FIG. 8 describes the case in which decisional step 405 (shown in FIG. 4) results in a determination that the calling party number is unknown, and where the call placed by service node 109 (at step 707A, shown in FIG. 7) is answered by a voice mail system.

In FIG. 8, the following numerals describe the legs of the call flow:

1=Call from caller 101 to subscriber 105
1'=Redirection of call 1 to service node 109 after hitting termination attempt trigger (TAT) at SSP 104
2=Call from service node 109 to subscriber 105
2'=Redirection of call 2 to voicemail system Initially, caller 101 places a call (shown as leg 1) to subscriber 105. Upon reaching SSP 104, the call hits a termination attempt trigger (shown at step 403 in FIG. 4). Based on communications with SCP 107 (as described in steps 404 and 405 of FIG. 4), it is determined that the call is not to be terminated at subscriber 105, but rather is to be redirected to service node 109. Thus, the call is shown as two legs in FIG. 8: leg 1 which represents the communication between caller 101 and SSP 104, and leg 1', which represents the portion of the call after SSP 104 has redirected it to service node (SN) 109.

As noted above, FIG. 8 depicts the example in which the calling party number is unknown and thus cannot merely be unblocked. Such a call is identified to a subscriber of the privacy screening service by having the service node ask caller 101 to record his or her name, as described at step 410 in FIG. 4. (It should be noted that the service node may also ask the calling party to record his or her name in the case where the calling party's number is known and private—i.e., the party has directed that the number not be provided by subscribing to a "caller ID blocking" service—and where calling party has failed to unblock the number within a specified time.) After the calling party has recorded his or her name, service node (SN) 109 places a call to subscriber 105 by the process described in steps 707A–713 (shown in FIG. 7a). However, unlike the case shown in FIG. 7a in which the call is terminated to the subscriber, in the example of FIG. 8 subscriber 105 has subscribed not only to a privacy screening service, but also to a voice mail service. When subscriber 105 fails to answer the call, the call is redirected to voice mail system 802. When voice mail system 802 answer the call, it begins to play a greeting (e.g., "You've reached the voice mail of the Jones family. Please record your message after the beep."), while, at the same time, service node 109 plays a pre-recorded privacy screening message (e.g., "Call coming in from <recorded name>. Do you want to accept or reject.") The present invention provides a technique whereby service node 109 and voice mail system 802 may recognize that they are in communication with each other and act accordingly, thereby preventing the situation where each of the two machines plays a recorded message and then waits for the other machine to provide a human response.

Figure 9A:
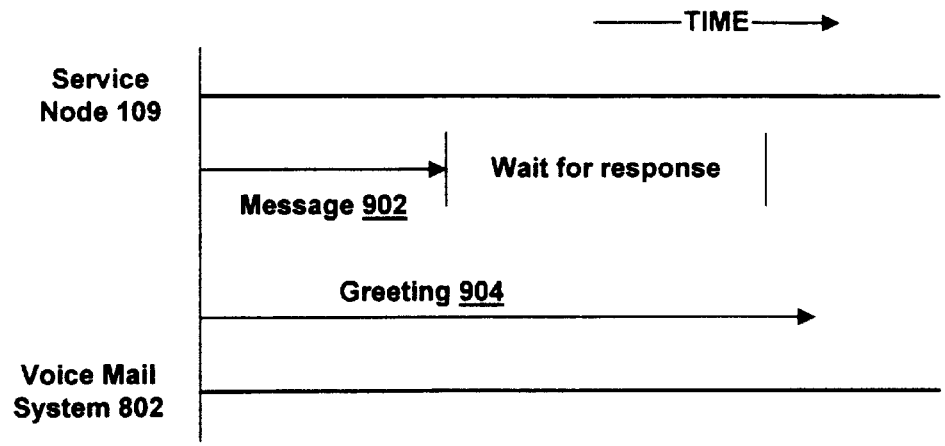
FIGS. 9A and 9B are timing diagrams showing various scenarios in which a service node that implements a privacy screening service, and a voice mail system, play their respective recorded messages.
Figure 9B:
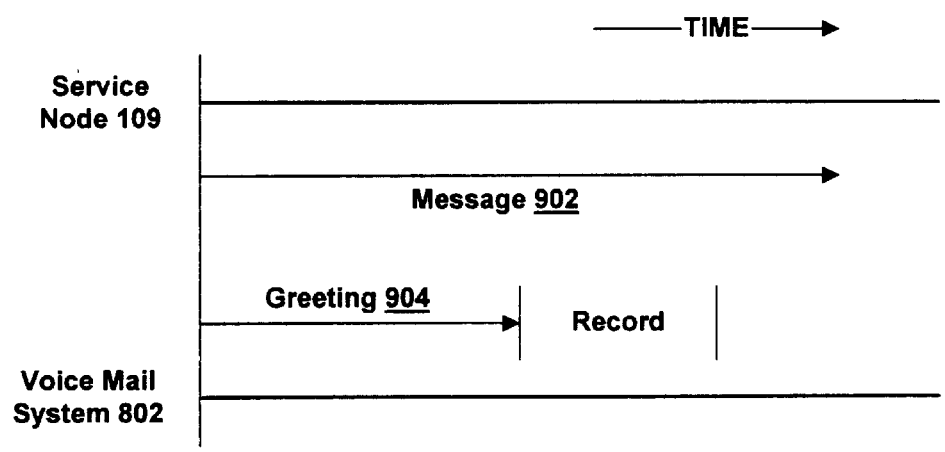

With reference to FIGS. 9A and 9B, two different situations are shown in which service node 109 and voice mail system 802 being playing their respective recorded messages as soon as the call connects. In FIG. 9A, the case is shown in which the privacy screening message (e.g., "Call coming in from <recorded name> . . . ") is shorter than the voice mail greeting (e.g., "You've reached the voice mail of the Jones family . . . ") In this example, privacy screening message 902 completes first, and service node 109 proceeds to wait for a response. While waiting for a response, voice mail system continues playing the greeting. Service node 109 will time out waiting for a response, because a typical voice mail system 802 is not equipped to provide a response.

In FIG. 9B, a different example is shown in which privacy screening message 902 is longer than greeting 904. In this case, greeting 904 completes first and then voice mail system 802 beings recording. Since service node 109 is still playing privacy screening message 902, voice mail system 802 may record the tail end of privacy screening message 902. Thus, if privacy screening message 902 is "Call coming in from <recorded name>. Do you want to accept or reject," when the subscriber to the voice mail service hears the recorded message, he or she may hear a portion of the privacy screening message 901, such as, " . . . want to accept or reject." The subscriber may not be able to make any sense of this message fragment.

Figure 10:
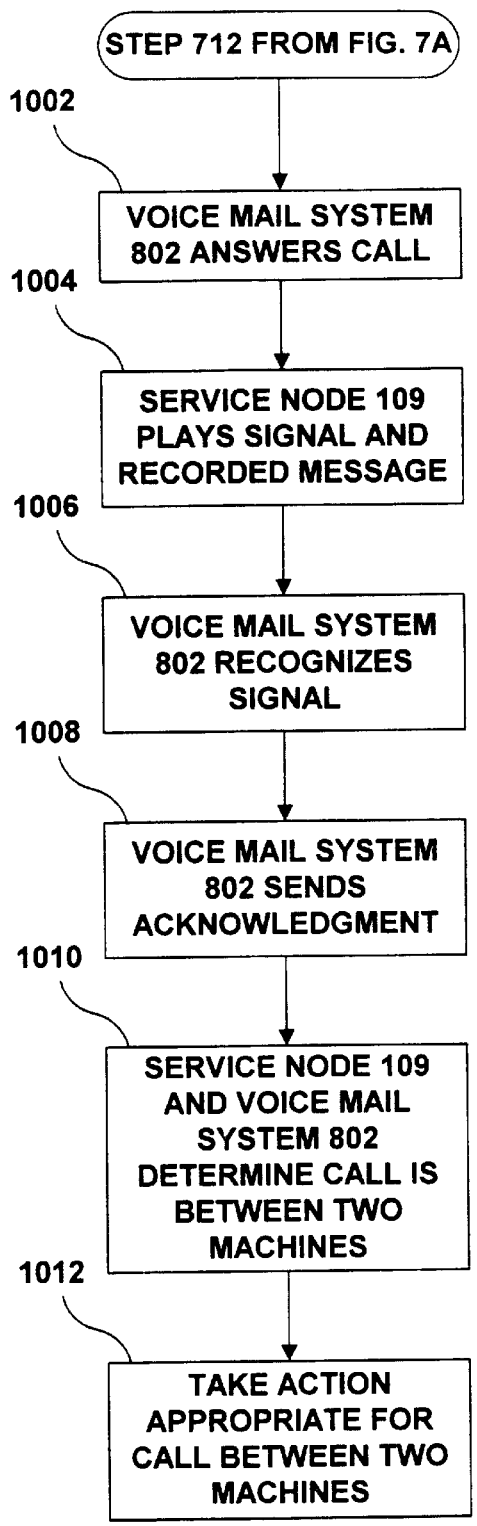
FIG. 10 is a flow diagram of an automatic machine detection process in a call between a service node and a voice mail system.

With reference to FIG. 10, a process is now described for performing automatic machine detection in the situation shown in FIGS. 9A and 9B. The process of FIG. 10 begins after step 712 in the process shown in FIGS. 7–7a. Specifically, the process of FIG. 10 begins at the point where the call has been placed from an unknown number, the caller at the unknown number has recorded his or her name, the service node has placed a call to the subscriber in order to play a message including the recorded name, and the SCP has authorized termination of the service node's call to the subscriber. However, unlike the case shown in FIGS. 7–7a wherein the call terminates to the subscriber by the subscriber's answering the call, in FIG. 10 it is presumed that the subscriber has not answered the call or, for some other reason, the call has been redirected to voice mail system 802 (shown in FIG. 8).

Thus, at step 1002, voice mail system 802 answers the call from service node 109. At step 1004, service node 109 plays a signal and a recorded message. As one example, service node 109 may precede the recorded message by a particular tone (e.g., a machine-generated sine wave at a particular pitch). Preferably, the tone is a dual-tone comprising two different frequencies, because such dual-tones are particular easy to recognize by machine, and the machine detection mechanism is unlikely to confuse such a dual-tone with a real conversation. Thus, the audio generated by service node 109 could be "<TONE > Call coming in from <recorded name > . . . " It should be appreciated that a tone that precedes the recorded message is merely one non-limiting example of a signal, and other types of signals may be used without departing from the spirit and scope of the invention. Any type of signal may be used so long as it is recognizable by voice mail system 802, so that voice mail system 802 can identify that the communicated message is a privacy screening service call from service node 109.

It should be observed that, while FIG. 10 depicts the case in which voice mail system 802 answers the call from service node 109, the playing of a signal along with the recorded message is not limited to the case where voice mail system 802 answers the call. On the contrary, it is contemplated that service node 109 will play the signal every time it places a call to play a "recorded name" message. Service node 109 has no way of knowing whether its call has been directed to voice mail system 802 at the time that it beings playing a message. The function of the signal is to say: "This call is coming from a machine," and to let the recipient of the call decide whether that fact is of any significant, or what action needs to be taken. The signal that is played at step 1004 is preferably designed to be audibly unobtrusive, so that if the call from service node 109 is answered by a human being (e.g., the subscriber), the signal can be easily disregarded. In fact, a subscriber to the privacy screening service may be unaware of the meaning or significance of the signal and simply ignores it.

At step 1006, voice mail system 802 recognizes the signal that was played at step 1004. The process by which a machine may detect the presence of a particular audible signal is well known in the art and therefore is not described herein.

At step 1008, voice mail system 802 sends an acknowledgement to service node 109. The acknowledgement has the effect of indicating that voice mail system 802 has recognized and understood the signal generated by service node 109 and wishes to inform service node 109 that a machine has answered the call. As one example, the signal sent by voice mail system 802 at step 1008 may be an audible tone (which is preferably distinct from the audible tone generated by service node 109 at step 1004). As with the signal generated at step 1004, the acknowledgement signal is preferably a dual-tone.

After the completion of step 1008, service node 109 and voice mail system 802 conclude that the call is between two machines (step 1010). The process then continues to step 1012, where either service node 109, voice mail system 802, or both, take some action that is appropriate for a call between two machines.

Figure 11:
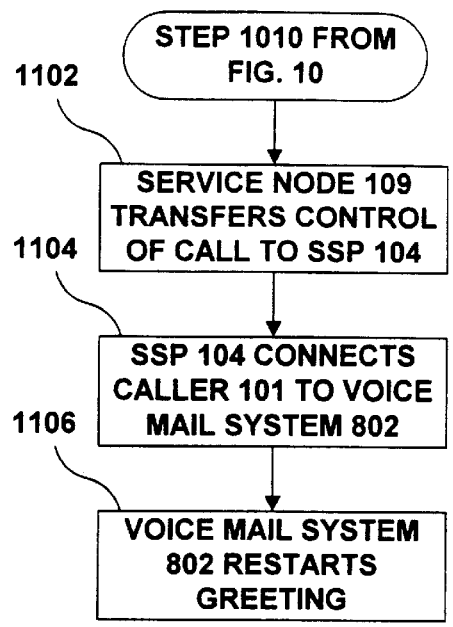
FIG. 11 is a flow diagram of a procedure that may be followed upon a determination that a service node's call has been answered by a voice mail system.

Any appropriate action, or set of actions, may be taken at step 1012. FIG. 11 shows a particular set of actions that may be appropriate in the context of a privacy screening service. As previously described, one function of a privacy screening service is to prevent a call from terminating to a subscriber of the service unless the caller can be identified. In the case where voice mail system 802 has answered the call on behalf of subscriber, termination of the call to the subscriber has already been averted, so it may be desirable to allow the unknown caller to leave a voice mail for the subscriber. FIG. 11 shows an exemplary set of steps that may be used to accomplish that result.

Thus, after it has been determined that service node 109 and voice mail system 802 are talking to each other, at step 1102 service node 109 transfers control of the call to SSP 104 (shown in FIG. 8). In response, SSP 104 connects caller 101 to voice mail system 802 (step 1104). After that connection is made, voice mail system 802 restarts its greeting (step 1006). From the perspective of caller 101, after recording his or her name, caller 101 waits for a brief time (while service node 109 attempts to call subscriber 105) and the next thing that caller 101 hears is the greeting generated by voice mail system 802. Caller 101 is unaware of service node 109's initial contact with voice mail system 802 wherein a signal and an acknowledgment were exchanged. That "handshaking" between service node 109 and voice mail system 802 is transparent to caller 101, who merely hears the restarted voice mail greeting and is permitted to leave a message with voice mail system 802.

It should be observed that FIG. 11 is merely an exemplary action that may be taken after service node 109 and voice mail system 802 realize that their call is between two machines. In a different context, a different set of actions could be taken. For example, the privacy screening service may be designed with much stricter privacy standards under which a caller is not even permitted to leave a message for a subscriber without the subscriber's permission. In such a case, the actions taken at step 1012 might include simply disconnecting the call, since the subscriber is not present on the line to either accept or reject the call. In another example, voice mail system 802 might permit service node 109 to leave a message, rather than permitting caller 101 to leave a message. Thus, service node 109 might leave a message on voice mail system 802 of the form: "This is a call from the privacy manager. We attempted to deliver a call from <recorded name> but you were unavailable to accept or reject the call ."

Exemplary Service Node 109

Figure 12:
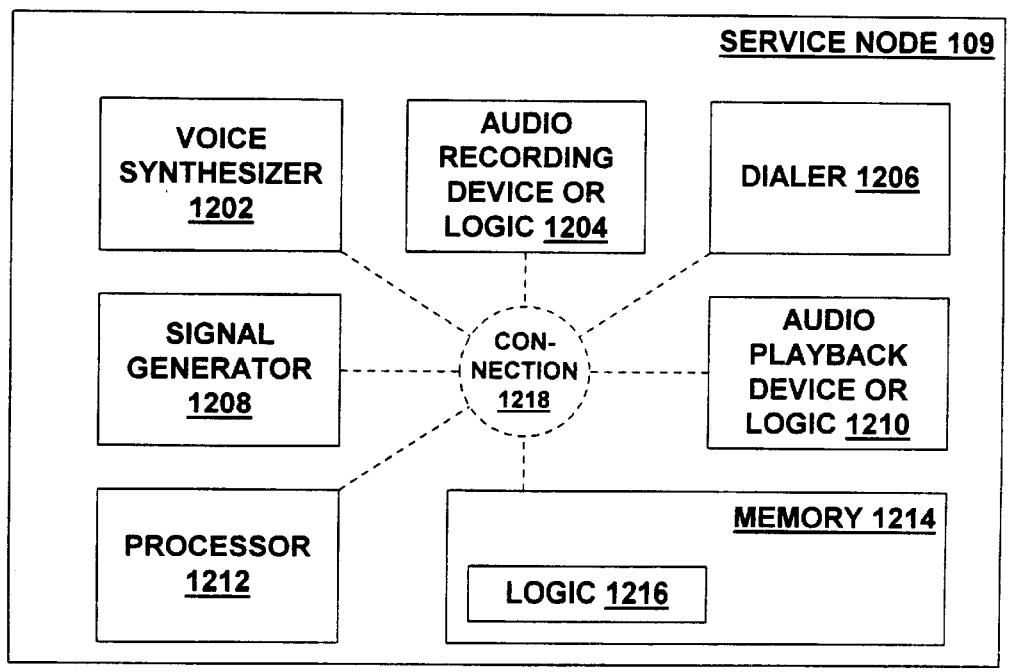
FIG. 12 is a block diagram of an exemplary service node in accordance with the invention.

It will be observed from the above discussion that the function of recording a name and transmitting the recorded name along with an identifiable signal is performed by service node 109. FIG. 12 shows an exemplary service node which may be used to perform these functions. Service node 109 includes a voice synthesizer 1202, an audio recording device/audio recording logic 1204, a dialer 1206, a signal generator 1208, an audio playback device/audio playback logic 1210, a processor 1212, and a memory 1214. It will be understood by those skilled in the art that these components may be able to communicate with each other within service node by a communications connection, such as connection 1218. Connection 1218 may comprise any means for communication within an electronic device (e.g., a ring, a bus, etc.).

Voice synthesizer 1202 includes circuitry or other hardware (e.g., an audio tape player) that generates a voice message. For example, voice synthesizer 1202 may generate the voice prompt that is transmitted to caller 101 and that instructs caller 101 to record his or her name.

An audio recording device 1204 records audio, such as the name that caller 101 gives in response to the prompt. Audio recording device 1204 may include circuitry or other hardware the performs the audio recording function. Alternatively, service node 109 may include audio recording logic 1204, which runs on a general-purpose processor (e.g., processor 1212) in order to record audio.

Dialer 1206 places calls on behalf of service node 109. For example, when service node 109 needs to place a call to another point in the advanced intelligent network, it provides the telephone number of such other point to dialer 1206, which, in turn, generates the information (e.g., tones) necessary to dial the specified number.

Signal generator 1208 generates the signal descried at step 1004 (shown in FIG. 10). For example, when the signal comprises preceding the recorded name with a tone (or a dual-tone), signal generator 1208 includes the circuitry or logic that produces the tone (or dual-tone). For example, signal generator 1208 may generate a sine-wave at a particular frequency (or, in the case of a dual-tone, sine-waves at two different frequencies).

Audio playback device 1210 generates audio from recorded audio. For example, audio playback device 1210 may generate audio based on recordings made by audio recording device/logic 1204. As in the case of audio recording device 1204, service node 109 may alternatively include audio playback logic 1210 which runs on a general-purpose processor in order to perform the function of generating audio.

Processor 1212 is a general-purpose computer processing device, such as a microprocessor. Processor 1212 executes computer-executable instruction (e.g., logic 1216) and performs actions based on those instructions. The instructions executed by processor 1212 may be stored in memory 1214. Memory 1214 is preferably a semiconductor random-access memory device that stores arbitrary data. One type of data that may be stored in memory 1214 is logic 1216, which comprises a set of instructions to be executed by processor 1212. Processor 1212 may perform different actions (possibly an infinite variety of different actions) based on what logic 1216 is stored in memory 1214. For example, logic 1216 may include the instructions that cause service node 109 to generate a prompt, record a name, and transmit the recorded name and a signal. It should be apparent that processor 1212 may instruct the various other elements of service node 109 to perform various action based on logic 1216.

The foregoing disclosure of embodiments of the present invention and examples of how the present invention can be carried out has been presented for purposes of illustration and description. It is not exhaustive or intended to limit the invention to the precise forms disclosed herein. Many variations and modifications of the embodiments and examples described herein will be obvious to one of ordinary skill in the art in light of the above disclosure. The scope of the invention is to be defined only by the claims appended hereto, and by their equivalents.

What is claimed is:

1. A method of telephone call processing comprising the acts of:

intercepting a first call from a first party destined for a second party;

establishing an audio communications link with said first party;

receiving an audible communication from said first party using the established communications link;

recording said audible communication;

placing a second call to said second party, said second party having a message recording service which answers said second call; and transmitting, over said second call, said audible communication and a signal recognizable by said message recording service.

2. The method of claim 1, wherein the transmission of said signal in said transmitting act precedes the transmission of said audible communication.

3. The method of claim 1, further comprising the act of:

transmitting, over said second call, a menu of choices, said choices including at least one of:

accepting said first party's call; and rejecting said first party's call.

4. The method of claim 1, wherein said signal comprises an audible signal.

5. The method of claim 1, wherein said signal comprises a dual-tone.

6. The method of claim 1, further comprising the acts of:

receiving an acknowledgment from said message recording service; and performing one or more actions in response to said acknowledgment.

7. The method of claim 6, wherein said one or more actions comprise:

connecting said first party to said message recording service.

8. The method of claim 7, wherein said message recording service plays an outbound message upon receipt of a call, and wherein said one or more actions comprise:

restarting said outbound message.

9. The method of claim 1, further comprising the act of:

following said establishing act, generating an audio prompt for said first party to record said first party's name.

10. The method of claim 1, wherein said method is performed in an Advanced Intelligent Network (AIN) having a service switching point and a service node, wherein said service switching point hosts a termination attempt trigger associated with said second party, and wherein said intercepting act comprises:

actuating said termination attempt trigger; and redirecting said first call such that it terminates at said service node.

11. The method of claim 10, wherein said Advanced Intelligent Network further has a service control point, and wherein said intercepting act further comprises:

in response to the actuation of said termination attempt trigger, querying said service control point to obtain identifying information about said first party; and determining that said service control point will not provide said identifying information.

12. The method of claim 11, wherein said identifying information is unknown to said service control point.

13. The method of claim 11, wherein said first party has directed that said identifying information not be provided.

14. The method of claim 1, further comprising the act of:

following said establishing act, prompting said first party to record identifying information about said first party.

15. The method of claim 1, wherein said message recording service comprises a voice mail system.

16. The method of claim 1, further comprising the act of:

upon placement of said second call, redirecting said second call to said message recording service.

17. In an Advanced Intelligent Network (AIN) having a service switching point and a service node, a method of processing a first call from a first party destined for a second party comprising the acts of:

said service switching point redirecting said call to said service node;

said service node receiving an audible communication from said first party;

said service node placing a second call to said second party, said second party having a message recording service which answers said second call; and said service node transmitting, over said second call, said audible communication and a signal recognizable by said message recording service.

18. The method of claim 17, said Advanced Intelligent Network further having a service control point communicatively connected to said service switching point, said service switching point hosting a termination attempt trigger which is actuated whenever a call destined for said second party is placed, said method further comprising the acts of:

in response to the actuation of said termination attempt trigger, said service switching point transmitting a query to said service control point; and said service control point transmitting to said service switching point, in response to said query, an instruction to route said call to said service node.

19. The method of claim 18, wherein said Advanced Intelligent Network further comprises a database accessible to said service control point, and wherein said method further comprises the acts of:

said service control point receiving said query;

said service control point performing a database lookup in response to said query, said database looking being based on said second party's telephone number; and said service control point receiving information from said database;

wherein said instruction is based on the received information.

20. The method of claim 17, wherein the transmission of said signal in said transmitting act precedes the transmission of said audible communication.

21. The method of claim 17, wherein said signal comprises an audible signal.

22. The method of claim 17, wherein said signal comprises a dual-tone.

23. The method of claim 17, further comprising the acts of:

said message recording service recognizing said signal; and said message recording service performing one or more actions in response to said signal.

24. The method of claim 23, said one or more actions comprising:

said message recording service transmitting an acknowledgment of said signal.

25. The method of claim 24, further comprising the acts of:

connecting said first party to said message recording service in response to said acknowledgment.

26. The method of claim 23, wherein said message recording service plays an outbound message upon receipt of a call, and wherein said one or more actions comprise:

restarting said outbound message.

27. An advanced intelligent network comprising:

a first service switching point communicatively connected to a first party telephone station;

a second service switching point communicatively connected to a second party telephone station, said second service switching point being communicatively connected to said first service switching point, said second service switching point including a termination attempt trigger which takes an action when an incoming call destined for said second party is received, said one or more actions including generating a query;

a service control point, communicatively connected to said second service switching point, which receives said query from said second service switching point and which, based on said query, instructs said service switching point to redirect said incoming call to a point in said advanced intelligent network different from said second party telephone station;

a service node which receives the redirected call, said service node being communicatively connected to said second service switching point, said service node including:

a voice synthesizer which generates a prompt to record an audio communication;

an audio recording device or audio recording logic which records said audio communication;

a dialer which places a call to a specified party;

a signal generator which produces an identifiable signal;

an audio playback device or audio playback logic which reproduces the audio communication recorded by said audio recording device or logic;

logic which receives said instruction from said second service switching point and which, in response to said instructions, directs said voice synthesizer to generate said prompt for transmittal to said first party over the redirected call, directs said audio recording device or logic to record said first party's response to said prompt, directs said dialer to place a call to said second party, directs said audio playback device or logic to reproduce said first party's recorded response, and directs said signal generator to generate said signal.

28. The advanced intelligent network of claim 27, wherein said signal generator generates an audible tone.

29. The advanced intelligent network of claim 27, wherein said signal generator generates a dual-tone.

30. The advanced intelligent network of claim 27, further comprising:

a voice mail system which answers calls placed to said second party, which recognizes said identifiable signal, and which transmits an acknowledgment when said identifiable signal is recognized.

31. The advanced intelligent network of claim 30, wherein said service node further includes logic which instructs said second service switching point to connect said first party to said voice mail system upon receipt of said acknowledgment.

* * * * *